J. P. Smith,
Band Pulley.
No. 80,777.     Patented Aug. 4, 1868.

Witnesses:
N. B. Smith
Alex. Mahon

Inventor
James P. Smith
by his atty
Addison M. Smith

United States Patent Office.

JAMES P. SMITH, OF OSHAWA, CANADA, ASSIGNOR TO HIMSELF AND FRANCIS W. GLEN, OF SAME PLACE.

Letters Patent No. 80,777, dated August 4, 1868.

IMPROVEMENT IN PULLEY.

*The Schedule referred to in these Letters Patent and making part of the same.*

TO ALL WHOM IT MAY CONCERN:

Be it known that I, JAMES P. SMITH, now residing in Oshawa, in the county and Province of Ontario, and Dominion of Canada, have invented certain new and useful Improvements in Pulleys; and I do hereby declare the following to be a full, clear, and exact description of the same, reference being had to the accompanying drawing, making a part of this specification, in which—

Similar letters of reference denote corresponding parts in all the figures.

Figure 1:
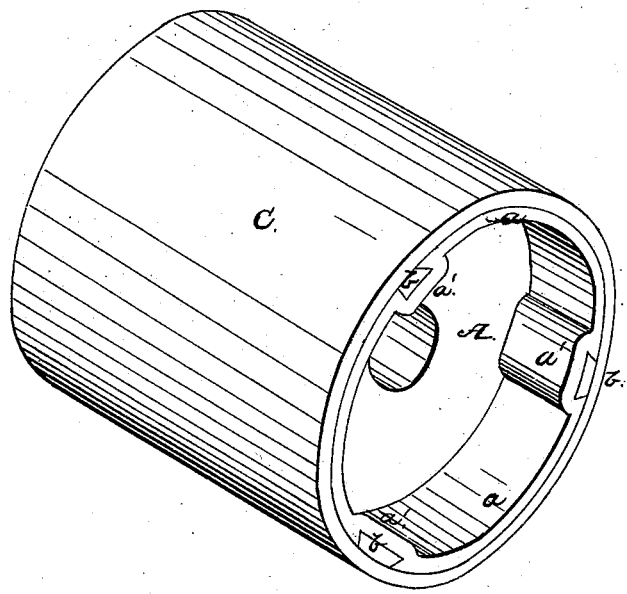
Figure 1 is a perspective view of a pulley embracing my improvements.
Figure 2:
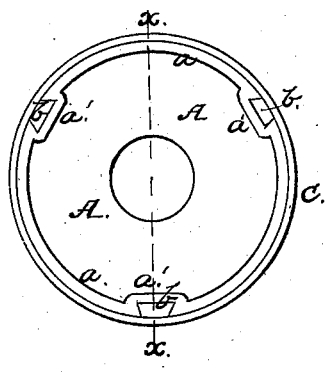
Figure 2 is an end elevation.
Figure 3:
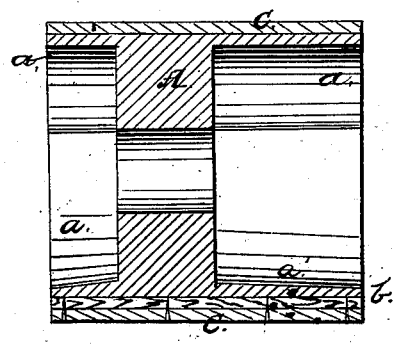
Figure 3 is a longitudinal section of the same, taken in line $x\ x$, fig. 2.

My invention consists in forming or casting metal pulleys, with grooves or recesses in their peripheries to receive pieces or strips of wood, or other suitable material, to which a leather, rubber, canvas, or other pliable facing may be secured by nails, or other suitable fastenings, in such manner that the same may be readily applied or removed and renewed, as hereinafter described.

In the accompanying drawing, I have represented the metal part or body of the pulley made or cast in one piece, in a form well adapted to combine lightness and strength, and consisting of a flanged hub or centre, A, the flanges or rims, $a$, being provided with the grooved ribs $a'$, in the grooves of which the strips of wood, $b$, or other equivalent material, are placed; but it will be obvious that my invention or improvement may be applied to any of the various forms of pulley in use.

I have shown the grooves made in dove-tail form, and extending longitudinally across the face of the pulleys, but the form and arrangement of the grooves may be varied, and simple recesses or sockets in the face of the pulley may be found sufficient for the purpose.

The pulley is provided with a facing of leather, or other pliable material, shown at C, which is readily secured to the strips or blocks $b$ by nails, or other suitable fastenings, in such manner that it may be easily removed and renewed when desired.

The advantages of facing the pulley with leather or other pliable materials are well understood by those familiar with their use. Ordinarily the pulleys have to be drilled to receive the fastenings for such facing, thereby involving a considerable outlay of labor and expense before the facing can be secured thereto, a difficulty which is entirely obviated by my improvement, as the pulleys may be as readily cast with the grooves or recesses therein, as in the ordinary form.

The thickness of the facing may be varied so as to slightly vary the speed of the driving and driven-pulleys, if desired, the strips $b$ affording a ready means of securing any required number of thicknesses or coatings of leather, or other equivalent material, as described.

Having now described my invention, what I claim as new, and desire to secure by Letters Patent, is—

1. A metal pulley, provided with grooves or recesses in its periphery, for the purpose set forth.

2. A grooved or recessed metal pulley, in combination with the strips or pieces $b$ and the facing C, substantially as described.

JAMES P. SMITH.

Witnesses:
S. B. FAIRBANKS,
O. W. SMITH.